United States Patent Office 3,008,968
Patented Nov. 14, 1961

3,008,968
PROCESS FOR MAKING 2-METHYL-3-(3'-4'-METHYLENEDIOXYPHENYL)-PROPANAL
Muus G. J. Beets and Harm van Essen, Hilversum, Netherlands, assignors to International Flavors & Fragrances I.F.F. (Nederland) N.V.
No Drawing. Filed Jan. 29, 1959, Ser. No. 789,795
Claims priority, application Great Britain Feb. 11, 1958
1 Claim. (Cl. 260—340.5)

We have discovered a process for making 2-piperonyl-propanal or 2-methyl-3-(3'-4'-methylenedioxyphenyl)-propanal of structure I which is an outstanding perfume:

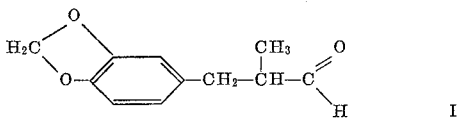

2-methyl-3-(3'-4' - methylenedioxyphenyl) - propanal may be prepared according to several methods of synthesis, as illustrated in the following examples:

(1) Iso-safrole may be converted by reaction with formaldehyde, followed by hydrogenolysis according to the method described by Beets (Rec., 70 (1951), 20) and by Drukker and Beets (Rec., 70 (1951), 29) into the odorless 2-methyl - 3-(3'-4' - methylenedioxyphenyl)-propanol-1 of structure III which may be converted into 2-methyl-3-(3'-4'-methylenedioxyphenyl) - propanal by oxidation or by catalytic dehydrogenation according to well-known methods.

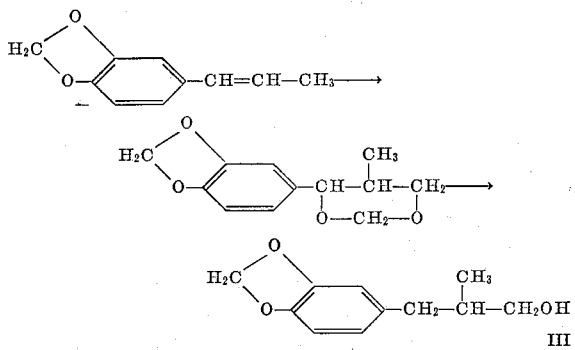

(2) 2-piperonylidene-propanal (IV) which may be obtained in high yields by alkali-catalyzed condensation of piperonal with propionic aldehyde, may be converted into the corresponding acetal (type V or type VI)

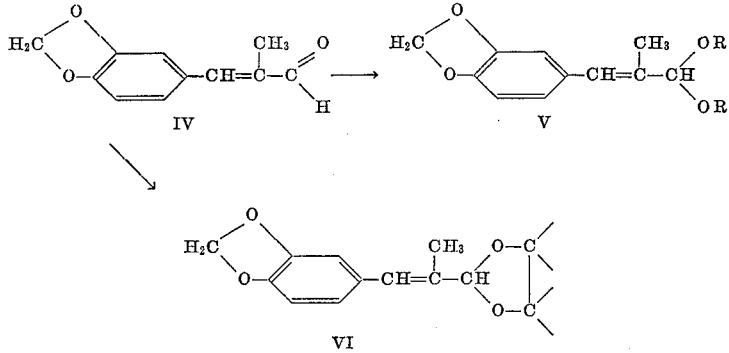

The double bond in such acetals can be hydrogenated catalytically and 2-methyl-3-(3'-4'-methylenedioxyphenyl)-propanal is obtained by acid hydrolysis of the saturated acetal.

(3) 2-methyl-3 - (3'-4'-methylenedioxyphenyl) - propionic acid which is easily accessible by Perkin reaction or by malonic ester or acid condensation of piperonal followed by hydrogenation may be converted in several known ways into the aldehyde. As examples may be mentioned catalytic reduction of the acid chloride or of the thio-ester.

However, by far the most simple and economic method is the partial catalytic hydrogenation of 2-piperonylidene-propanal (IV). This is possible since the hydrogenation of the double bond proceeds at a considerably higher speed than that of the carbonyl group. The alcohol III, usually obtained as the main by-product of partial hydrogenation, may be either removed, e.g. by distillation or by boric ester separation, or if it is desired to prepare a cheaper technical quality of 2-methyl-3-(3'-4'-methylenedioxyphenyl)-propanal, the alcohol III, which is colorless and odorless, may be left in the aldehyde as a harmless diluent.

The same holds good for the unsaturated alcohol VII (melting-point purified trans-isomer: 45.3° to 45.9°), which however, is mostly obtained as a minor impurity.

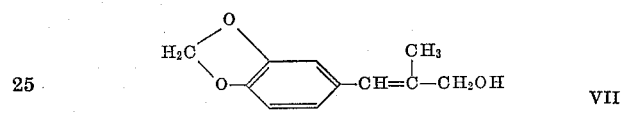

The catalytic hydrogenation of IV may be carried out in the presence of Raney nickel. It is usually carried out in an inert solvent for which lower aliphatic alcohols such as methanol and ethanol are very suitable, although other solvents, such as esters, dioxanes, and ethers may be used as well.

The partial catalytic hydrogenation of 2-piperonyl-idene-propanal proceeds smoothly at room temperature but also lower or higher temperatures, preferably not higher than 100° C., are suitable.

The hydrogen pressure, apart from its influence on the hydrogenation velocity, has no influence of any importance on the course of the reaction. 2-methyl-3-(3'-4'-methylenedioxyphenyl)-propanal may be prepared conveniently at atmospheric or slightly increased pressures as well as at 2000 pounds per square inch (p.s.i.).

In the following examples some of the conditions under which this method may be carried out, are illustrated.

In all examples 2-piperonylidene-propanal obtained by condensation of piperonal with propanal in the presence of alkali is used. This is a mixture of 2-stereo-isomers in which the trans isomer (melting point 66.8 to 67.3° C.) predominates. Although the pure trans form may be isolated before the partial hydrogenation, this complicates the process without providing considerable advantages.

(1) 190 g. (1 mole) of 2-piperonylidene-propanal, 250 ml. of ethanol are hydrogenated in a stainless steel rocking autoclave in the presence of Raney nickel at 50° C. and 300 p.s.i. After 1 mole of hydrogen or more, depending on the selectivity of the hydrogenation, has been taken up, the hydrogenation is interrupted and after removal of the catalyst and the solvent, the reaction product is distilled with the calculated amount of boric acid, and fractionated in vacuum. Boiling point 134 to 135° at 3 mm. Hg $n_D^{20}$ 1.5350 to 1.5360. The aldehyde prepared in this way usually contains a varying but small amount of the unsaturated aldehyde. This is shown by the somewhat increased refractive index. Although this does not harm the odor, it may be removed by fractionation in a more efficient distillation column.

(2) 570 g. (3 moles) of piperonylidene-propanal are hydrogenated at 300 to 400 p.s.i. at room temperature in the presence of 1140 g. of methanol and 40 g. of Raney nickel.

After 2 to 2.5 hours, 115% of the calculated amount of hydrogen has been taken up. The hydrogenation is interrupted, the catalyst and the solvent are removed and the residue is distilled without a column in vacuo.

The distillate, 552 g., is analyzed by oximation (76.5% as piperonyl-propanal). 15 g. of boric acid are added and the water formed in the esterification is distilled off in vacuum. After completion of the reaction, high-vacuum is applied and the aldehyde is distilled and fractionated. Yield 393 g. or 68.2% of the theory. Aldehyde by oximation 100.9%, acid value 0; $n_D^{20}$ 1.5340.

The same experiment carried out at 0° C. and 2000 p.s.i. hydrogen pressure yielded, after a hydrogenation period of 4 hours, 66% of the theory.

(3) 76 g. of piperonylidene-propanal (0.4 mole) are hydrogenated in the presence of 12 g. of Raney nickel and 76 g. of methanol at a maximum pressure of 100 p.s.i. at 23° ot 25° C. The reaction is stopped after 110% of the calculated amount has been taken up (2¾ hours). After removal of catalyst and solvent the reaction product was distilled.

Yield 74 g., $n_D^{20}$ 1.5411. Aldehyde content 87.2% of which 2.1% (spectrophotometrically determined) is piperonylidene-propanal.

Boric acid purification and fractionation in vacuum yielded 80% of 2-piperonyl-propanal.

(4) The experiment described under (3) is repeated at 25° C. and 1000 to 1200 p.s.i. hydrogen pressure. After 110% of the theory has been taken up (1 hour) the reaction product is worked up. Yield 73.5 g. Aldehyde assay 82.9% of which 0.5% (spectrop.) are piperonylidene-propanal.

After purification the yield amounts to 76%. About the same result was obtained when the hydrogenation was carried out in dioxane or ethyl butyl ether.

(5) 76 g. (0.4 mole) of piperonylidene-propanal are hydrogenated in the presence of 62 g. of Raney nickel and 129 g. of amyl acetate. The hydrogenation is carried out under 100 p.s.i. at 100° C.

The aldehyde content of the crude reaction product is 65% of which 10% is piperonylidene-propanal.

(6) 76 g. of piperonylidene-propanal were hydrogenated at 250 p.s.i. and 50° C. in the presence of 135 ml. of methanol and 30 g. of a nickel-catalyst 10% on kieselguhr.

After 2.5 hours 110% of the theory of hydrogen had been taken up. The catalyst and the solvent were removed and the reaction product was distilled. Yield 75 g. Aldehyde assay 70.8% of which 13.0% is piperonylidene-propanal.

The less efficent or more complicated methods of preparation mentioned in this text may be illustrated by the following examples:

(7) 412 g. (2.16 moles) of 2-piperonylidene-propanal are converted into the diethyl acetal by refluxing for 3 hours with 444 g. of ethyl orthoformate, 444 g. of absolute alcohol and 12 g. of ammonium chloride. The acetal, which shows a somewhat inconstant boiling point (160° to 170° C. at 5 mm. Hg.) and refractive index ($n_D^{20}$ 1.5300 to 1.5340) due to the presence of cis- and trans-isomers, is purified by fractional distillation in vacuum. Yield 80%. 420 g. (1.59 moles) of this acetal are hydrogenated in a stainless steel rocking autoclave at 310 p.s.i. and 140° C. in 250 ml. of ethanol and in the presence of Raney nickel. 2-piperonyl-propanol-diethylacetal is purified by vacuum distillation. Boiling point 152° C. at 4 mm. Hg. $n_D^{20}$ 1.4980–1.4990. The acetal is converted into 2-methyl-3-(3'-4'-methylenedioxyphenyl)-propanal by hydrolysis in the known way. The aldehyde is obtained as a colorless or light yellow liquid of boiling point 139° to 140° C. at 4.5 mm. Hg.: $n_D^{20}$ 1.5341.

(8) A mixture of 400 g. Raney nickel and 1200 ml. of acetone is refluxed for 45 min. 40 g. of ethyl piperonyl-thio propionate (0.16 mole), 80 ml. of acetone and 80 ml. of water added. The mixture is refluxed for 45 min. and worked up. Yield 30 g. of distilled product. Aldehyde assay 60%.

What we claim is:

A process for making 2-methyl-3-(3'-4'-methylenedioxyphenyl)-propanal, comprising the step of subjecting 2-piperonylidene-propanal to partial catalytic hydrogenation in the presence of Raney nickel at a pressure between 100 and 1200 p.s.i. and at a temperature between room temperature and about 100° C.

References Cited in the file of this patent
UNITED STATES PATENTS 2,184,526    Meuly _____ Dec. 26, 1939

OTHER REFERENCES

Bogert et al.: J. Am. Chem. Soc., vol. 53, pages 2747–2755 (1931).